R. G. LUNDGREEN.
CRANK CASE REINFORCEMENT.
APPLICATION FILED SEPT. 30, 1919.

1,345,204.

Patented June 29, 1920.

Inventor:
Robert G. Lundgreen
By Gillson & Gillson
Attys.

UNITED STATES PATENT OFFICE.

ROBERT G. LUNDGREEN, OF CHICAGO, ILLINOIS.

CRANK-CASE REINFORCEMENT.

1,345,204.  Specification of Letters Patent.  Patented June 29, 1920.

Application filed September 30, 1919. Serial No. 327,506.

*To all whom it may concern:*

Be it known that I, ROBERT G. LUNDGREEN, a citizen of the United States, and resident of Chicago, county of Cook, and State of Illinois, have invented certain new and useful Improvements in Crank-Case Reinforcements, of which the following is a specification and which are illustrated in the accompanying drawings, forming a part thereof.

The lower member of the fly wheel and crank case of the Ford automobile is made of a single piece of pressed steel. The entire engine and fly wheel mechanism is supported by a bearing at the front end of this member and by two brackets, one at each side of the fly wheel housing, riveted thereto. In addition, the front radius rods are attached to this pressed steel member. The consequence of this variety of severe stresses is that in many instances the housing cracks at the attachment of the brackets thereto, and the added stress upon the portion where the crank case closure joins the fly wheel housing causes cracks at this point. Since the fly wheel housing is the lowest point of the combined structure it forms the main reservoir for crank case oil and therefore such cracks as mentioned cause leakage of oil in addition to their weakening effect.

The present invention has for an object the provision of means that will both supplement the support of the structure by the brackets of the original equipment and will supplement the strength of the walls of the structure in its demonstrated weakest point.

An illustrative embodiment of the invention is shown in the accompanying drawings in which.

Figure 1:
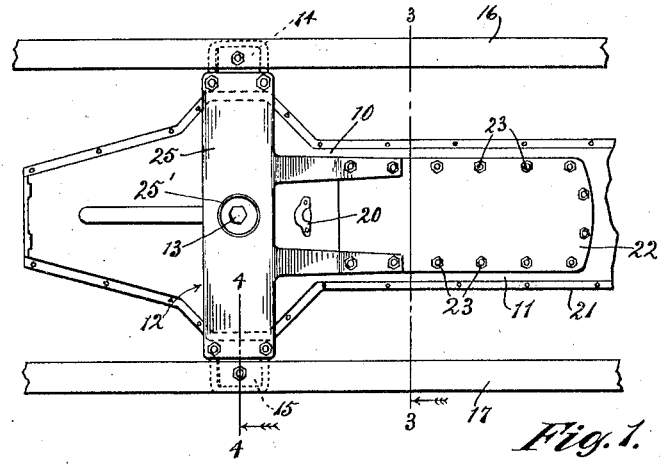
Figure 1 is a fragmentary bottom plan view of a Ford automobile crank and fly wheel case and frame.
Figure 2:
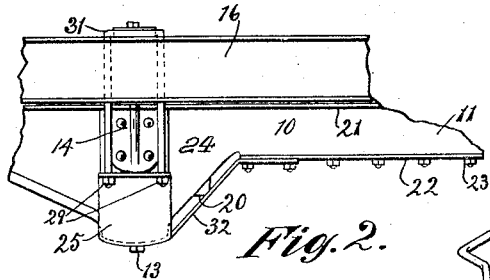
Fig. 2 is a side elevation of the structure of Fig. 1.
Figure 4:
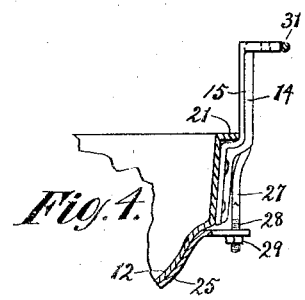
Fig. 4 is a detail section on line 4—4 of Fig. 1.
Figure 5:
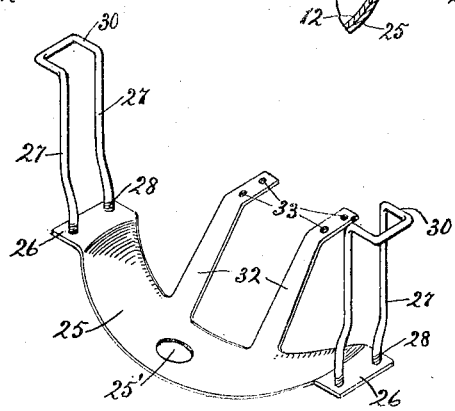
Fig. 5 is a perspective view of a structure embodying the invention.
Figure 3:
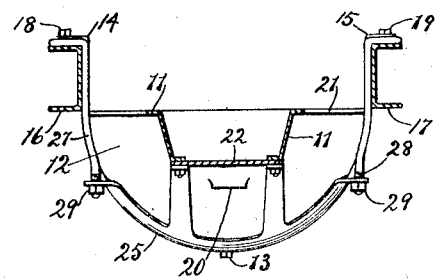
Fig. 3 is a section on line 3—3 of Fig. 1.

The member which it is desired to reinforce is shown at 10, and comprises the lower portion of the crank case as 11 and of the fly wheel housing as 12, having a drain plug as 13. This member supports the entire engine and fly wheel and is carried by a single front bearing, not shown, and by brackets 14, 15, hooked over and bolted to the frame members 16, 17, as at 18, 19.

For attachment of the front radius rods of the machine, a lug as 20 is provided. The member 10 is secured to the upper member of the crank case as by bolting flange 21 to a corresponding flange on the other member.

To give access to the interior of the crank case without dismantling the engine a bottom cover plate 22 is provided which is secured in place by lag bolts as 23.

The most frequent failures of the member 10 are yielding of the material to stress of brackets 14, 15 and cracking in the region 24 due to pull of the radius rods in addition to the stresses due to the weight of the engine.

The present invention provides as a support for the member 10 an arcuate metal member as 25 in the nature of a sling perforated, as at 25', for access to the drain plug, having out turned terminal flanges as 26, perforated for reception of supporting means. As a means of supporting the sling 25 there are shown a pair of brackets 27 each formed of a single piece of rod with threaded extremities as 28, which may be passed through openings in flanges 26 and receive each a nut as 29. The brackets, as shown, are formed by bending the rod upon itself and by then bending the bight of the rod outwardly, as at 30, forming an angular extension. The angular extension, in use, is hooked or lapped upon the top of a frame member 16 or 17. When in place the angular extension 30 surrounds the end of one of the brackets 14 or 15 as indicated at 31, and is thereby prevented from slipping off from the frame member. By tightening the nuts 29, as much as desired of the weight formerly carried by brackets 14, 15 may be transferred to brackets 27.

For supplementing the strength of portion 24 of the housing 10 a pair of braces as 32 are shown. These braces 32 may be secured to sling 25 in any desired manner as by riveting or welding or they may be stamped integral therewith. The ends of braces 32 are turned at an angle to fit against the cover plate. To secure the braces to the housing one or more of the lag bolts 23 may be removed and the braces 32 may be perforated, as at 33, in registry with the openings for said bolts 23. As shown in the drawings, there are two perforations 33 in each of the braces 32. When the braces are in place lag bolts of greater length than those removed may be passed through perforations 33 and screwed tight.

As described the structure may be put in place in a very short space of time by a person without mechanical skill and will overcome the weaknesses described.

Many minor changes may be made in the physical embodiment of the invention without departing from its spirit.

I claim as my invention—

1. In combination, an automobile frame, a crank and fly wheel case, supporting means for attaching said case to the frame, supplemental supporting means underlying one portion of said case, bracing means projecting from said supplemental supporting means and attached to another portion of said case, and means for attaching said supplemental supporting means to the frame.

2. Means for reinforcing a fly wheel and crank case, comprising an outwardly convex arcuate sling, a brace projecting from said sling for attachment to the case, and brackets adapted to secure said sling in position in supporting relation with a fly wheel casing.

ROBERT G. LUNDGREEN.